United States Patent Office 3,428,663
Patented Feb. 18, 1969

3,428,663
β-NITROALKYL MERCURIC HALIDES AND
METHOD OF PREPARING SAME
Gustave Bryant Bachman, Lafayette, Ind., and Maynard
Lester Whitehouse, Delmar, N.Y., assignors to Purdue
Research Foundation, Lafayette, Ind., a corporation of
Indiana
No Drawing. Filed June 15, 1966, Ser. No. 557,620
U.S. Cl. 260—431                    12 Claims
Int. Cl. C07f 3/10; A01n 9/38

ABSTRACT OF THE DISCLOSURE

As compositions of matter β-nitroalkyl mercuric halides which are of the formula

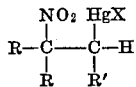

wherein X represents a halogen radical, R represents a lower alkyl radical or hydrogen, R' represents hydrogen, a lower alkyl radical or the radical

or the radical

and R² represents a lower alkyl radical. The β-nitroalkyl mercuric halides are useful as bactericides and fugicides, in particular in stabilizing petroleum lubricants.

---

This invention relates to novel compositions of matter. In a particular aspect this invention relates to novel β-nitroalkyl mercuric halides and to methods for preparing same.

An object of the present invention is the provision of novel β-nitroalkyl mercuric halides of the formula

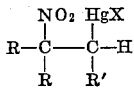

wherein X represents a halogen radical selected from the group consisting of chlorine and bromine, R represents a lower alkyl radical or hydrogen, R' represents hydrogen, a lower alkyl radical, the radical

or the radical

and R² represents a lower alkyl radical. Included among the novel β-nitroalkyl mercuric halides of the present invention are 1-chloromercuri-2-nitroethane, 3-chloromercuri - 4 - methyl - 4 - nitro - 2 - pentanone, 1 - chloromercuri - 2 - nitropropane, methyl 2-chloromercuri - 3 - nitropropionate, 1 - bromomercuri - 2 - nitroethane, 1 - chloromercuri - 2 - nitro - 2 - methylbutane, 1 - chloromercuri - 2 - nitrocyclohexane, 1 - bromomercuri - 2- nitrocyclohexane, 1 - bromomercuri - 2 - nitropropane, 2 - chloromercuri - 4 - methyl - 3 - nitropentane, etc. and the like.

A further object of the present invention is the provision of methods for preparing the novel β-nitroalkyl mercuric halides of the formula

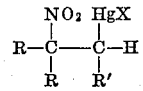

where R, R' and X have the values assigned above.

Additional objects and advantages of the present invention will be apparent from the specification and the appended claims.

The novel β-nitroalkyl mercuric halides may be prepared by any suitable method. A preferred method of preparation involves reacting in an aqueous medium a mercuric halide selected from the group consisting of mercuric chloride and mercuric bromide, an alkali metal nitrite and an olefin of the formula

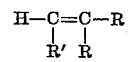

wherein R and R' are defined as above. The reaction is sensitive to steric hindrances and will generally not proceed when the R and R' groupings consist of long chain or branched chain alkyl radicals. For the purpose of this invention, therefore, the term "lower alkyl radical" is taken to include lower alkyl radicals having from 1 to about 8 carbon atoms. Examples of suitable olefins include ethylene, methyl acrylate, propylene, 2-methyl-1-butene, mesityl oxide, cyclohexene, cis-4-methyl-2-pentene, etc. and the like. Such olefins are commercially available. Examples of suitable alkali metal nitrites include potassium nitrite and sodium nitrite.

The preferred method of preparation is typically conducted at a temperature in the range of from about 0 to about 50° C. Temperatures below about 0° C. are generally not practical because of the slow rate of reaction while temperatures above 50° C. tend to cause substantial decomposition of the reaction products. It is preferred to use a temperature in the range of from about 20 to about 30° C.

The time required for the completion of the reaction can vary over a wide range and will depend among other things on the solubility and reactivity of the particular olefin employed in the process and the temperature of reaction. Reaction times of several hours to several days have been noted. Completion of the reaction is indicated when an aliquot of the reaction mixture does not give a positive test for mercuric ion as for example when the addition of aqueous sodium iodide fails to precipitate mercuric iodide.

The β-nitroalkyl mercuric halides obtained by the preferred method of preparation precipitate from the aqueous reaction mixture upon formation. The precipitated compositions can be recovered from the aqueous reaction medium by any suitable means. Such means include centrifugation and filtration. If a purer product is desired, the recovered material is first washed with water and then incorporated in a suitable low boiling solvent, as for example dichloromethane or chloroform, to form a solution. Petroleum ether is then added to the solution to precipitate the β-nitroalkyl mercuric halide. Precipitation is facilitated by cooling the solution to on the order of 10° C. The precipitated β-nitroalkyl mercuric halide may be separated from the petroleum ether-solvent mixture by any suitable procedure.

In an alternative procedure the β-nitroalkyl mercuric halides of the present invention can be obtained by incorporating an olefin having the above formula into an aqueous reaction medium containing in solution mercuric nitrate and an alkali metal nitrite. The aqueous reaction medium is then intimately mixed with an approximately equal volume of dichloromethane and the mixture is allowed to stand to facilitate separation into a lower dichloromethane layer and an upper water layer. The layers are separated as by decantation. An aqueous alkali halide solution, for example potassium chloride or sodium chloride, is then added with intimate mixing to the separated dichloromethane layer to form the β-nitroalkyl mercuric halide. The mixture is allowed to stand to facilitate separation into a lower dichloromethane layer and an upper water layer. The layers are separated by any suitable procedure, as by decantation. The β-nitroalkyl mercuric halide is then recovered from solution by precipitation with petroleum ether. The reaction is generally carried out at temperatures within the range of about 0 to about 50° C. and preferably in the range of from about 20 to about 30° C. as in the preferred method.

The β-nitroalkyl mercuric halides of the present invention are pH sensitive and tend to decompose at pH values lower than about 4.5 and higher than about 7.0. Therefore, irrespective of the method of preparation the pH of the reaction mixture should be maintained within this range.

The novel β-nitroalkyl mercuric halides exhibit bactericidal and fungicidal characteristics and are useful in stabilizing petroleum lubricants against the deleterious effects of bacteria.

The invention will be understood more fully by reference to the following examples. It is understood that the examples are presented for purposes of illustration only and are not intended as a limitation of the invention.

EXAMPLES 1–8.—PREPARATION OF β-NITROALKYL MERCURIC HALIDES

Examples of the preparation of β-nitroalkyl mercuric halides of the formula

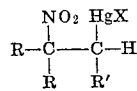

wherein R, R′ and X are defined as above are presented in Table I. The reactions were carried out with olefins of the formula

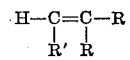

wherein R and R′ are defined as above by the following general procedure:

In a 1 liter 3-necked flask equipped with a stirrer and condenser are placed 138.0 g. (2 moles) of sodium nitrite, 271.5 g. (1 mole) of mercuric chloride (mercuric bromide in Example 6) and 500 ml. of distilled water. The mixture is stirred until a homogeneous yellow solution is attained. To this solution is then added one mole of olefinic compound; if gaseous, the olefinic compound is bubbled through the mixture until all the mercuric ions are consumed. Whether the olefinic material is gaseous or liquid the mixture is stirred rapidly to facilitate intimate contact between the reactants. The reaction time for the olefinic compound depends principally on its solubility and reactivity; the less soluble the olefinic compound, the longer the reaction time.

During the reaction period materials in the flask tend to adhere to the side of the flask. The adhered material is easily broken up by scraping the side of the flask with an appropriately bent spatula. The reaction is considered to be complete when an aliquot of the reaction mixture does not give a positive test for mercuric ion. After completion of the reaction, the product is filtered and air dried. The dried product is then dissolved in hot dichloromethane to remove any mercurous halide. The dichloromethane solution is then treated with petroleum ether which has been washed with sulfuric acid to remove aromatic compounds and the β-nitroalkyl mercuric halide is recovered.

TABLE I

| Ex. No. | Olefinic Compound | Product | Reaction Time | Conversion Based on Olefin, percent | M.P., ° C. | Analyses Calc'd. | Analyses Found |
|---|---|---|---|---|---|---|---|
| 1 | $CH_2=CH_2$ | 1-chloromercuri-2-nitroethane | 10–12 hrs | 66–69 | 103–4, decompose | C 7.75, H 1.30, N 4.52, Cl 11.44 | 7.70, 1.54, 4.55, 11.66 |
| 2 | $CH_2=CHCH_3$ | 1-chloromercuri-2-nitropropane | 18 hrs | 77–80 | 75–6, decompose | C 11.12, H 1.87, N 4.32, Cl 10.94 | 11.47, 1.80, 4.08, 10.62 |
| 3 | $CH_2=\underset{\underset{CH_3}{\mid}}{C}-CH_2CH_3$ | 1-chloromercuri-2-nitro-2-methylbutane | 3–4 hrs | 69–80 | 68–9, decompose | C 17.05, H 2.86, N 3.98, Cl 10.07 | 17.31, 3.08, 3.87, 9.97 |
| 4 | Cis $CH_3-\underset{\underset{H}{\mid}}{C}=\overset{\overset{H}{\mid}}{C}-CH(CH_3)_2$ | 2-chloromercuri-4-methyl-3-nitropentane | 144 hrs | 12 | 117–118, decompose | C 19.68, H 3.30, N 3.82, Cl 9.68 | 19.50, 3.38, 3.61, 9.80 |
| 5 | $H_2C\underset{\underset{H_2}{C-C}}{\overset{C=C}{\diagup\diagdown}}CH_2$ (cyclohexene) | 1-chloromercuri-2-nitrocyclohexane | 28 hrs | 79 | 91–3, decompose | C 19.79, H 2.77, N 3.84, Cl 9.74 | 19.76, 2.91, 3.72, 9.52 |
| 6 | $H_2C\underset{\underset{H_2}{C-C}}{\overset{C=C}{\diagup\diagdown}}CH_2$ (cyclohexene) | 1-bromomercuri-2-nitrocyclohexane | 1 week | 45 | 80–2, decompose | C 17.64, H 2.47, N 3.43, Br 19.56 | 18.11, 2.72, 3.45, 19.05 |
| 7 | $CH_2=CH-\underset{\underset{}{\overset{\overset{O}{\parallel}}{C}}}-OCH_3$ | Methyl 2-chloromercuri-3-nitropropionate | 24 hours | 69.1 | 149–152, decompose | C 13.05, H 1.64, N 3.81, Cl 9.63 | 13.18, 1.74, 3.69, 9.40 |
| 8 | $(CH_3)_2C=CH-\underset{\underset{}{\overset{\overset{O}{\parallel}}{C}}}-CH_3$ | 3-chloromercuri-4-methyl-4-nitro-2-pentanone | 3 hours | 24.7 | 85–87, decompose | C 18.95, H 2.56, N 3.68, Cl 9.33 | 19.05, 2.91, 3.72, 9.32 |

EXAMPLE 9

The antibacterial and antifungal effects of 1-chloromercuri-2-nitropropane were tested using the following procedure:

Solutions of 1-chloromercuri-2-nitropropane in acetone in concentrations of 10, 25, 50, 100, 500 and 1000 p.p.m. are prepared. Each solution is mixed with a suitable agar medium and after solidification is inoculated with a 24 hour bacteria strain or a 48 hour fungus strain. The bacteria are then incubated at 37° C. for 24 hours and the fungi are incubated for 48 hours at 28° C. The lowest concentration of 1-chloromercuri-2-nitropropane which prevents all growth of the organism is noted. These values are presented in Table II.

TABLE II

Inhibitory concentration of 1-chloromercuri-2-nitropropane to bacteria and fungi

| Culture: | Inhibitory concentration (p.p.m.) |
|---|---|
| Staph. aureus | 50 |
| Strep. fecalis | 25 |
| Strep. hemolyticus | 25 |
| Escherichia coli | 50 |
| Past. pseudotuberculosis | 25 |
| Pseudomonas aeruginosa | 25 |
| Aspergillus niger | 500 |
| Candida albicans | 100 |
| Penicillium sp. | 100 |
| Fusarium oxysporum | 10 |
| Trichophyton mentagrophytes | 25 |

EXAMPLE 10

This example is offered to illustrate the effectiveness of 1-chloromercuri-2-nitropropane as a stabilizer against bacteria for petroleum cutting oil. The cutting oil concentrate utilized in the example is sold by Gulf Oil Corporation under the name Gulfcut Soluble Oil and contains no bacterial inhibitors.

A cutting oil mixture is prepared by mixing 25 parts by weight of water and 1 part by weight cutting oil concentrate. To each of three one-gallon containers is added 1 liter of water-cutting oil mixture. Desired amounts of 1-chloromercuri-2-nitropropane are added to two of the containers. No inhibitor is added to the other container which is used as a control. Each container is then inoculated with 5 mls. of a heterogeneous bacteria culture which had grown for several years in a water-cutting oil mixture. Aeration and mixing is obtained by using an air lift to continually circulate the mixture. The test is continued for a period of six weeks and during the six weeks' period. 5 mls. of bacteria culture were added at periodically weekly intervals. The results of the test were presented in Table III.

TABLE III

| Concentration in p.p.m. of 1-chloromercuri-2-nitropropane in water-cutting oil mixture: | Number of weeks effective in inhibiting bacterial growth |
|---|---|
| 0 | 0 |
| 100 | 3 |
| 500 | >6 |

EXAMPLE 11

The following is a stabilized steam cylinder oil which is adequately protected by the addition of β-nitroalkyl mercuric halides of the present invention:

| | Percent by weight |
|---|---|
| S.A.E. lubricating oil | 90 |
| Oleic acid | 10 |

EXAMPLE 12

The following is a core oil which is adequately protected by the addition of β-nitroalkyl mercuric halides of the present invention:

| | Percent by weight |
|---|---|
| Crude tall oil | 25 |
| Fuel oil | 35 |
| Tall oil ester | 40 |

EXAMPLE 13

The following is a cutting oil which is adequately protected by the addition of β-nitroalkyl mercuric halides of the present invention:

| | Percent by weight |
|---|---|
| Tallow | 65 |
| Paraffin wax | 29 |
| Beeswax | 1.3 |
| Oxalic acid | 1.3 |
| Potassium citrate | 1.3 |
| Urea | 0.4 |

Since many embodiments may be made in this invention and since many changes may be made in the embodiments described, the foregoing is to be interpreted as illustrative only and the invention is defined by the claims which follow.

We claim:

1. A compound of the formula

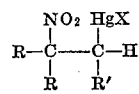

in which X represents a halogen selected from the group consisting of chlorine and bromine and R represents a member selected from the group consisting of hydrogen and lower alkyl radical, R' represents a member selected from the group consisting of hydrogen, lower alkyl radical, the radical

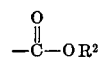

and the radical

and R² represents a lower alkyl radical.

2. 1-chloromercuri-2-nitroethane.
3. 1-chloromercuri-2-nitropropane.
4. 1-chloromercuri-2-nitro-2-methylbutane.
5. 1-chloromercuri-2-nitrocyclohexane.
6. 1-bromomercuri-2-nitrocyclohexane.
7. Methyl 2-chloromercuri-3-nitropropionate.
8. 3-chloromercuri-4-methyl-4-nitro-2-pentanone.
9. A process for the production of β-nitroalkyl mercuric halide of the formula

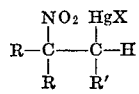

wherein X represents halogen selected from the group consisting of chlorine and bromine and R represents a member selected from the group consisting of hydrogen and a lower alkyl radical, R' represents a member selected from the group consisting of hydrogen, lower alkyl radical, the radical

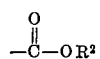

and the radical

and R² represents a lower alkyl radical, which comprises reacting in an aqueous reaction medium and at a pH in the range of from about 4.5 to about 7.0 an alkali metal nitrite, a mercuric halide selected from the group consisting of mercuric chloride and mercuric bromide and an olefin of the formula

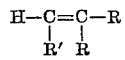

wherein R represents a member selected from the group consisting of hydrogen and a lower alkyl radical, R' represents a member selected from the group consisting of hydrogen, lower alkyl radical, the radical

and the radical

and $R^2$ represents a lower alkyl radical to produce the β-nitroalkyl mercuric halide.

10. The process of claim 9 wherein the reaction is carried out at a temperature in the range of from about 0 to about 50° C.

11. The process of claim 10 wherein the temperature is in the range of from about 20 to about 30° C.

12. A process for the production of β-nitroalkyl mercuric halides of the formula

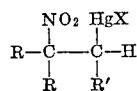

in which X represents a halogen selected from the group consisting of chlorine and bromine, R represents a member selected from the group consisting of hydrogen and lower alkyl radical, R' represents a member selected from the group consisting of hydrogen, lower alkyl radical, the radical

and the radical

and $R^2$ represents a lower alkyl radical which comprises providing an aqueous reaction medium containing in solution mercuric nitrate and alkali metal nitrite the said medium having a pH in the range of from about 4.5 to about 7.0, adding to the said reaction medium an olefin of the formula

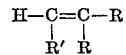

wherein R represents a member selected from the group consisting of hydrogen and lower alkyl radical, R' represents a member selected from the group consisting of hydrogen, lower alkyl radical, the radical

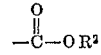

and the radical

and $R^2$ represents a lower alkyl radical, the said reaction medium being maintained at a pH in the range of from about 4.5 to about 7.0, mixing the said reaction medium with dichloromethane, the pH of the resulting mixture being maintained at in the range of 4.5 to about 7.0, permitting the resulting mixture to form an upper separable water layer and a lower separable dichloromethane layer separating the said dichloromethane layer from the said water layer, retaining the said dichloromethane layer, the pH of the said dichloromethane layer being maintained in the range of from about 4.5 to about 7.0, adding alkali metal chloride to the separated dichloromethane layer while maintaining the pH of the said dichloromethane layer in the range of from about 4.5 to about 7.0 to form β-nitroalkyl mercuric halide.

References Cited

UNITED STATES PATENTS 3,127,431  3/1964  Fink _____ 260—31 XR

OTHER REFERENCES

Chemical Abstracts, vol. 55, p. 27026 (1961).
Chemical Abstracts, vol. 57, p. 12522 (1962).
Whitmore, Organic Compounds of Mercury, The Chemical Catalog Co. Inc., New York (1921), p. 148.

TOBIAS E. LEVOW, *Primary Examiner.*

H. M. S. SNEED, *Assistant Examiner.*

U.S. Cl. X.R.

252—49.5, 49.7; 424—292